United States Patent [19]

Wong

[11] Patent Number: 5,000,139
[45] Date of Patent: Mar. 19, 1991

[54] AUTO-STARTER DEVICE FOR INTERNAL COMBUSTION ENGINE AND THE LIKE

[76] Inventor: Gim Wong, 202 Perkins St., Estevan, Saskatchewan, Canada, S4A 2K1

[21] Appl. No.: 516,818

[22] Filed: Apr. 30, 1990

[51] Int. Cl.⁵ .............................................. F02N 11/08
[52] U.S. Cl. ................................ 123/779 B; 180/167; 290/38 C; 307/10.6
[58] Field of Search .......... 123/179 B, 179 BG, 79 R; 290/38 C; 180/167; 307/10.6

[56] References Cited

U.S. PATENT DOCUMENTS

| | | | |
|---|---|---|---|
| 3,577,164 | 5/1971 | Re Baratelli et al. | 123/179 R |
| 4,345,554 | 8/1982 | Hildreth et al. | 123/179 BG |
| 4,926,334 | 10/1981 | Wong | 290/37 R |

FOREIGN PATENT DOCUMENTS 1215765 12/1986 Canada .

Primary Examiner—Andrew M. Dolinar
Attorney, Agent, or Firm—Murray E. Thrift; Stanley G. Ade; Adrian D. Battison

[57] ABSTRACT

An automobile engine starter includes a controller for monitoring the internal temperature of the vehicle and generating a temperature signal when that temperature falls outside a predetermined range. The vehicle is also equipped with a mobile telephone or radio receiver that may receive a signal from a remote location to generate a remote starting signal that may be combined with the temperature signal to start the engine when both signals are present.

2 Claims, 1 Drawing Sheet

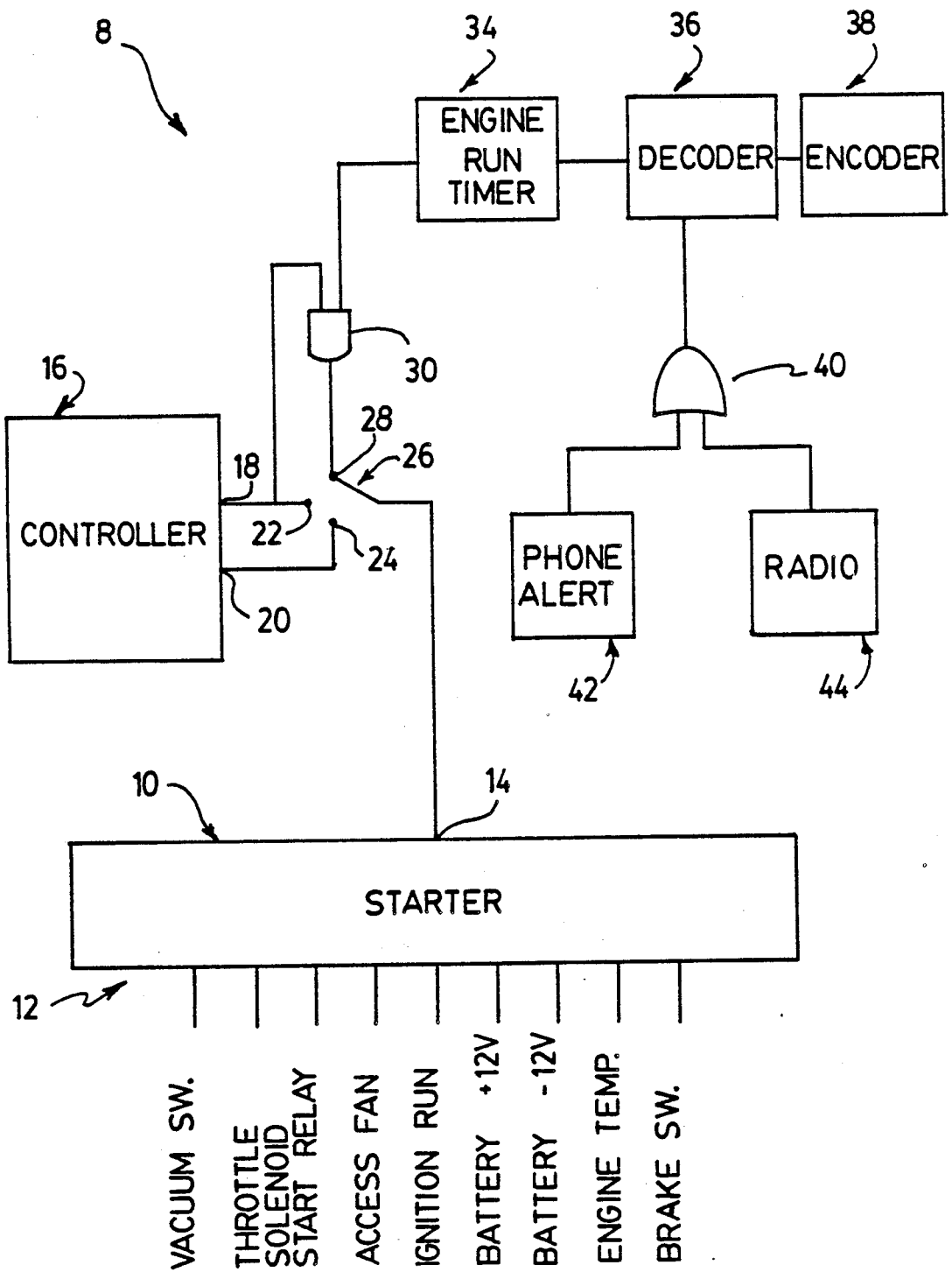

AUTO-STARTER DEVICE FOR INTERNAL COMBUSTION ENGINE AND THE LIKE

FIELD OF THE INVENTION

The present invention relates to starting devices for engines such as automobile engines.

BACKGROUND

In my U.S. Pat. No. 4,296,334, the disclosure of which is incorporated herein by reference there is described a programmable electronic starting device for automobiles and the like. The starting device incorporates means that are selectable to actuate automotive accessories. This device enables predetermined time functions and predetermined temperatures to be entered into programmable memories so that when certain times or temperatures are reached, the device is actuated and serves to start the engine, to allow the engine to run for a predetermined time or until a predetermined temperature is reached and then to shut off the engine.

My Canadian patent 1,215,765 describes an electronic programmable controller device that permits programs to be set to operate any electrical apparatus by means of programmed time settings or programmed sensor settings, for example temperature settings.

The present invention relates to a combination of these two devices with additional apparatus that provides a wider range of options in starting an internal combustion engine than has heretofore been the case.

SUMMARY

According to the present invention there is provided an engine remote starting system comprising:
control means for monitoring at least one engine start parameter and for generating a control start signal when the engine start parameter exceeds a predetermined value;
signal receiving means for generating a remote start signal in response to receipt of a predetermined signal from a remotely located transmitter;
AND gate means operatively connected to the control means and the signal receiving means to receive control start signals and remote start signals for generating a combined start signal only when both the control start signal and the remote start signal are present; and
engine starting means operatively coupled to the AND gate means and to the engine for starting the engine in response to receipt of a combined start signal.

The signal receiving means may be a mobile telephone, a mobile radio or both. The engine may also be started at preprogrammed times or at preprogrammed temperature, depending on the programming of the control means and a selection by the operator.

By utilizing a mobile telephone or mobile radio to activate the starting circuits of a starting device such as that described in my U.S. Pat. No. 4,296,334, an operator may start an engine at any desired time and from almost any location without being limited to a short range and without interference from spurios signals.

Further means are provided in the apparatus so that the device may be operated only when the telephone ring signal matches a preselected number of rings. With a mobile radio, the apparatus may include a voice decoding apparatus operable only in response to specified personal voice commands.

The temperature responsive aspect of the controller described in my Canadian Patent 1,215,765 may be used to ensure that the engines only started when a remote signal is received by telephone or radio and the temperature within the vehicle exceeds a predetermined range.

The apparatus may also start the engine at any preprogrammed time or preprogrammed temperature, independently of the remote starting signal.

BRIEF DESCRIPTION OF THE DRAWING

The accompanying drawing is a schematic block diagram illustrating an electronic auto starter according to the present invention.

DETAILED DESCRIPTION

Referring to the accompanying drawing the automobile starter 8 includes a programmable electronic starting apparatus 10 such as that described in my U.S. Pat. No. 4,296,334. The apparatus 10 includes a number of electrical connections 12 that serve to initiate and control the operation of the engine and various of these accessories as described in the aforementioned patent. In this case, the apparatus has an input 14. The presence of a signal at the input 14 serves to initiate operation of the apparatus for starting an engine. An electronic programmable controller device 16 such as that described in my Canadian Patent 1,215,765 is also included in the overall system. This includes a temperature output 18 and a timer 20. The controller produces a signal at the temperature output when the monitored temperature, e.g. that within the vehicle falls below or above a predetermined temperature range. The controller device can be programmed to set that range so that it may be either a high temperature or a low temperature that generates the temperature signal. At the same time, the starting device 10 may control the accessories circuits turn on either a heater or an air conditioner for the vehicle temperatures desired.

The temperature and time outputs 18 and 20 are supplied as control start signals to terminals 22 and 24 respectively of a three-way switch 26. The third terminal 28 of the switch is connected to the output of an AND gate 30. One input to the AND gate is the signal from temperature output 18. The other input is from a programmable engine run timer 34. This timer may be programmed to generate an output signal for a predetermined time upon receipt of a signal at its input from a decoder 36. The decoder in turn receives a code signal from an encoder 38 and an input signal from an OR gate 40. The OR gate receives signals from a mobile telephone auxiliary alert circuit 42 and from a mobile radio receiver 44.

In operation, when a call is received by the mobile telephone, the alert circuit is activated to ring the telephone. This activation causes the auxiliary alert circuit output to change state from logic 1 (high) to logic 0 (low). This signal is fed to the decoder circuit which is set to respond to a preselected number of rings by the encoder. If the number of rings matches the preselected number of rings, the decoder produces a high output which triggers the programmable engine run timer 34 to start the timer to generate a remote start signal. This timer can be programmed to produce a high output for a selected time, say between 5 minutes and 35 minutes, etc. The AND gate 30 combines this with a high output at the temperature output 18 of the controller 16, designating a temperature outside the desired range to produce a high output from the AND gate 30. With the switch 26 set to receive a signal from the AND gate, the high output from the AND gate is passed to the input terminal 14 of the engine starter sequential controller circuit 10 to initiate the starting of the engine.

After the preprogrammed engine running time has expired or the desired vehicle temperature is reached, with the output from the AND gate goes low, to de-energize the starter 10 and shut down the engine.

A similar operation may be carried out using the mobile radio receiver 44. In this case the encoder and decoder must be controlled to respond to an appropriate radio signal, for example a personal command voice signal.

The switch 26 may be set to either terminal 22 or terminal 24 rather than the combined signal terminal 28 so that the engine starting operation will be controlled by temperature inside the vehicle or a preprogrammed time.

While one embodiment of the present invention has been described in the foregoing, it is to be understood that other embodiments ar possible within the scope of the invention. The invention is considered limited solely by the scope of the appended claims.

I claim:

1. An engine remote starting system comprising:
   control means for monitoring at least one engine start parameter and for generating a control start signal when the engine start parameter exceeds a predetermined value;
   signal receiving means for generating a remote start signal in response to receipt of a predetermined signal from a remotely located transmitter;
   AND gate means operatively connected to the control means and the signal receiving means to receive control start signals and remote start signals for generating a combined start signal only when both the control start signal and the remote start signal are present; and
   engine starting means operatively coupled to the AND gate means and to the engine for starting the engine in response to receipt of a combined start signal.

2. A remote starting system for a vehicle engine comprising:
   a mobile telephone receiver;
   a radio receiver;
   decoder means operatively connected to the telephone receiver and the radio receive for decoding signals received thereby and for generating a remote signal in response to the decoding of either a predetermined telephone ringer signal or a personal voice command radio signal;
   a programmable engine run timer operatively connected to the decoder means and initiated by receipt of a remote signal therefrom to generate a remote start signal for a selected time;
   a programmable control means including means operatively connected to the vehicle for monitoring vehicle temperature, means for recording a selectable temperature range, means for generating a temperature start signal when the vehicle temperature falls outside the program temperature range, programmable clock means for timing selectable intervals and operable to generate a time start signal upon expiry of each timed interval;
   AND gate means operatively connected to the engine run timer to receive remote start signals therefrom and operatively connected to the control means to receive temperature start signals therefrom and operative to produce a combined start signal in response to receipt of both the remote start and temperature start signals;
   engine starter sequence timer means operatively connected to the engine for initiating and controlling the starting of the engine in response to receipt of a start signal;
   switch means for selectively connecting the engine starter sequence timer means to the programmable control means and to the AND gate for selectively passing time start signals, temperature start signals or combined start signals to the engine starter sequence timer means.

* * * * *